United States Patent
Jain et al.

(10) Patent No.: US 10,075,909 B2
(45) Date of Patent: Sep. 11, 2018

(54) METHOD TO SELECT A CANDIDATE CELL DURING CELL SELECTION

(71) Applicant: Samsung Electronics Co., Ltd., Gyeonggi-do (KR)

(72) Inventors: Nitin Jain, Bangalore (IN); Subhasish Karmakar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 122 days.

(21) Appl. No.: 14/976,011

(22) Filed: Dec. 21, 2015

(65) Prior Publication Data

US 2016/0183182 A1    Jun. 23, 2016

(30) Foreign Application Priority Data

Dec. 19, 2014  (IN) ............................ 6417/CHE/2014
Sep. 2, 2015   (IN) ............................ 6417/CHE/2014

(51) Int. Cl.
*H04W 48/20*      (2009.01)

(52) U.S. Cl.
CPC .................................. *H04W 48/20* (2013.01)

(58) Field of Classification Search
CPC ... H04W 48/20; H04W 88/06; H04W 84/045; H04W 36/30; H04W 36/0083; H04W 72/02; H04W 36/0061; H04W 88/02; H04W 24/02; H04W 76/025; H04W 88/08; H04W 36/0072; H04L 5/001

See application file for complete search history.

(56) References Cited

U.S. PATENT DOCUMENTS

| 8,706,115 | B2 | 4/2014 | Pani et al. | |
|---|---|---|---|---|
| 9,319,914 | B2 * | 4/2016 | Narasimha | ............ H04W 24/10 |
| 2010/0197304 | A1 * | 8/2010 | Sawhney | .............. H04W 48/10 455/434 |
| 2011/0070880 | A1 * | 3/2011 | Song | ...................... H04L 5/001 455/423 |
| 2013/0034014 | A1 | 2/2013 | Jonsson et al. | |
| 2013/0130690 | A1 * | 5/2013 | Hunukumbure | ...... H04W 36/22 455/436 |
| 2014/0064129 | A1 | 3/2014 | Sane et al. | |
| 2015/0029917 | A1 * | 1/2015 | Kim | .................. H04W 52/0209 370/311 |

(Continued)

OTHER PUBLICATIONS

Seidel, Eiko et al., White Paper—Dual Cell HSDPA and its Future Evolution, Jan. 2009, Nomor Research GmbH, pp. 5.

*Primary Examiner* — Ricky Q Ngo
*Assistant Examiner* — Michael K Phillips
(74) *Attorney, Agent, or Firm* — The Farrell Law Firm, P.C.

(57) ABSTRACT

A user equipment (UE) and a method of cell selection by a UE are provided. The method includes maintaining a database for storing a multi-carrier availability status for a plurality of frequencies, wherein each frequency includes at least one of a multi-carrier configuration and a single-carrier configuration; determining whether a candidate cell corresponding to the multi-carrier configuration is available based on the multi-carrier availability status; and selecting the candidate cell corresponding to the multi-carrier configuration when a performance metric of the candidate cell is greater than a pre-defined threshold.

14 Claims, 7 Drawing Sheets

(56) References Cited

U.S. PATENT DOCUMENTS

| | | | |
|---|---|---|---|
| 2015/0092746 A1* | 4/2015 | Jang | H04W 24/08 |
| | | | 370/331 |
| 2015/0133134 A1* | 5/2015 | Ode | H04W 48/20 |
| | | | 455/450 |
| 2015/0172971 A1* | 6/2015 | Zhao | H04W 36/0077 |
| | | | 370/331 |
| 2015/0173009 A1* | 6/2015 | Vallath | H04W 48/18 |
| | | | 370/329 |
| 2015/0312805 A1* | 10/2015 | Cui | H04W 80/04 |
| | | | 370/331 |
| 2015/0382361 A1* | 12/2015 | Sabapathi | H04W 72/082 |
| | | | 370/329 |
| 2016/0353343 A1* | 12/2016 | Rahman | H04W 36/30 |

\* cited by examiner

| Index | Frequeny | Multi Carrier Status |
|---|---|---|
| 0 | F1 | |
| 1 | F2 | Set the status based on UE Experience |
| 2 | F3 | |
| ... | | |

METHOD TO SELECT A CANDIDATE CELL DURING CELL SELECTION

PRIORITY

This application claims priority under 35 U.S.C. § 119(a) to an Indian Provisional Patent Application filed on Dec. 19, 2014 in the Indian Intellectual Property Office and assigned Serial No. 6417/CHE/2014, and an Indian Complete Patent Application filed on Sep. 2, 2015 in the Indian Intellectual Property Office and assigned Serial No. 6417/CHE/2014, the entire contents of each of which are incorporated herein by reference.

BACKGROUND

1. Field of the Disclosure

The present disclosure generally relates to wireless communication, and more particularly, to a mechanism of cell selection by a user equipment (UE) for selecting a cell that corresponds to a candidate frequency.

2. Description of the Related Art

In a multi subscriber identification Module (SIM) user equipment (UE), such as a dual SIM dual standby (DSDS), a single radio frequency (RF) antenna is shared by both SIMs. Data throughput, in a specific radio access technology (RAT) is affected as the RF is occupied by other SIMs for a significant amount of time. This can be complemented by choosing frequencies, where the UE can achieve better through put according to a different RAT.

In single SIM operation, a multi-carrier configuration will always give a better user experience in terms of data throughput, at the cost of additional battery and processing resources.

A cellular operator may implement multi-carrier cellular technologies like long term evolution/global system for mobile/code division multiple access (LTE/GSM/CDMA) in certain frequencies and bands. This depends on frequencies/bands allocated to a particular operator in a certain geographical area. It may happen that in a particular band, an operator has only a single frequency allocated to it. But in another band same operator has multiple frequencies allocated, so multi-carrier high speed packet access (HSPA)/LTE/GSM/CDMA can be implemented in that band. It is known that the UE will experience better throughput in multi-carrier HSPA/LTE/GSM/CDMA technology as compared to single carrier technology. In the existing systems, although there is a multi-carrier frequency in a geographical area of the UE, it cannot select a cell that corresponds to the multi-carrier frequency, and therefore results in reduced throughput.

SUMMARY

The present disclosure has been made to address at least the above described problems and disadvantages, and to provide at least the advantages described below.

An aspect of the present disclosure provides a method for cell selection by selecting a cell of a candidate frequency.

Another aspect of the present disclosure provides a method to mark a candidate frequency preferred for cell selection.

Another aspect of the present disclosure chooses the candidate frequency to achieve good throughput, where single carrier and multi-carrier HSPA/LTE/GSM/CDMA technologies co-exist in the same geographical area.

Accordingly, an aspect of the present disclosure provides a method of cell selection by a user equipment (UE). The method includes maintaining a database for storing a multi-carrier availability status for a plurality of frequencies. Each frequency includes a multi-carrier configuration and/or a single-carrier configuration. Further, the method includes determining whether a candidate cell corresponding to the multi-carrier configuration is available based on the multi-carrier availability status. The method further includes selecting the candidate cell corresponding to the multi-carrier configuration when a performance metric of the candidate cell is greater than a pre-defined threshold.

Accordingly, an aspect of the present disclosure provides a user equipment (UE) configured to maintain a database to store a multi-carrier availability status for a plurality of frequencies. Each frequency includes a multi-carrier configuration and/or a single-carrier configuration. Further, the UE is configured to determine whether a candidate cell corresponding to the multi-carrier configuration is available based on the multi-carrier availability status and select the candidate cell corresponding to the multi-carrier configuration when a performance metric of the candidate cell is greater than a pre-defined threshold.

BRIEF DESCRIPTION OF THE DRAWINGS

The above and other aspects features and advantages of the present disclosure of the embodiments herein will be better understood from the following detailed description, taken in conjunction with the following drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments.

The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Throughout the following description, the terms "candidate" and "preferred" are used interchangeably.

The embodiments herein achieve a method of cell selection by a user equipment (UE). The UE chooses a candidate frequency to achieve good throughput, where single carrier HSPA/LTE/GSM/CDMA and multi carrier HSPA/LTE/GSM/CDMA technologies co-exist in the same geographical area. The method includes maintaining a database to store a multi-carrier availability status for a plurality of frequencies. Each frequency includes a multi-carrier configuration and/or single-carrier configuration. Further, the method includes determining whether a candidate cell corresponding to the multi-carrier configuration is available based on the multi-carrier availability status. In response to the availability of the multi-carrier configuration, the method includes selecting the candidate cell when a performance metric of the candidate cell is greater than a pre-defined threshold.

The method increases the chance of a UE getting multi-carrier HSPA/LTE/GSM/CDMA reception during a next connection establishment.

The method includes selecting the candidate cell corresponding to the multi-carrier configuration by detecting that a network is unable to configure the multi-carrier operation in the UE. The UE requests the network to configure inter-frequency measurements and performs inter-frequency measurement in which the multi-carrier configuration is available upon receiving configuration information from the network. The UE bias reports to the network about the inter-frequency measurements, and the UE selects the candidate cell corresponding to the multi-carrier configuration. That is, the UE reports more signal strength for inter-frequency (multi-carrier supported) cells, such that network thinks inter-frequency (multi-carrier supported) cells are better than the current serving frequency (not supporting multi-carrier configuration), and the network initiates inter-frequency handover.

Referring now to the drawings and more particularly to FIGS. 1-5, where similar reference characters denote corresponding features consistently throughout the figures, there are shown embodiments of the present disclosure.

Figure 1:
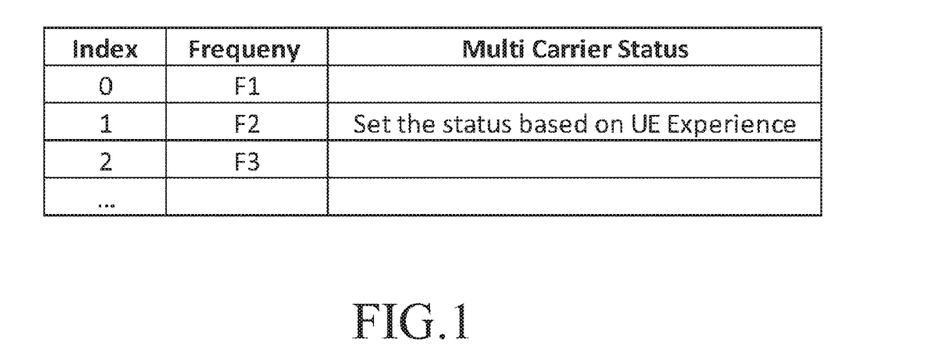
FIG. 1 illustrates a database in a user equipment (UE), in which the UE indicates an availability status of the frequency with a multi-carrier configuration for cell selection, according to an embodiment of the present disclosure.

FIG. 1 illustrates a database in a UE, in which the UE indicates an availability status of the frequency with a multi-carrier configuration for cell selection, according to an embodiment of the present disclosure. The UE's internal database stores multi-carrier availability status on different frequencies. The UE dynamically updates multi-carrier status for a plurality of frequencies in its database, based on experience of prior connections with the network. If the UE has received an indication of multi-carrier availability on a particular frequency, it can add an entry for that frequency as a candidate frequency among the list of frequencies in the database. In an embodiment, of the present disclosure the database is used by the UE to predict a multi-carrier availability during cell selection or cell reselection. The UE gives preference to such candidate frequencies, where a multi-carrier configuration information was received earlier. This will increase the chances of getting multi-carrier HSPA/LTE, even after consecutive cell selection and cell reselection due to connection release or UE mobility.

Figure 2A:
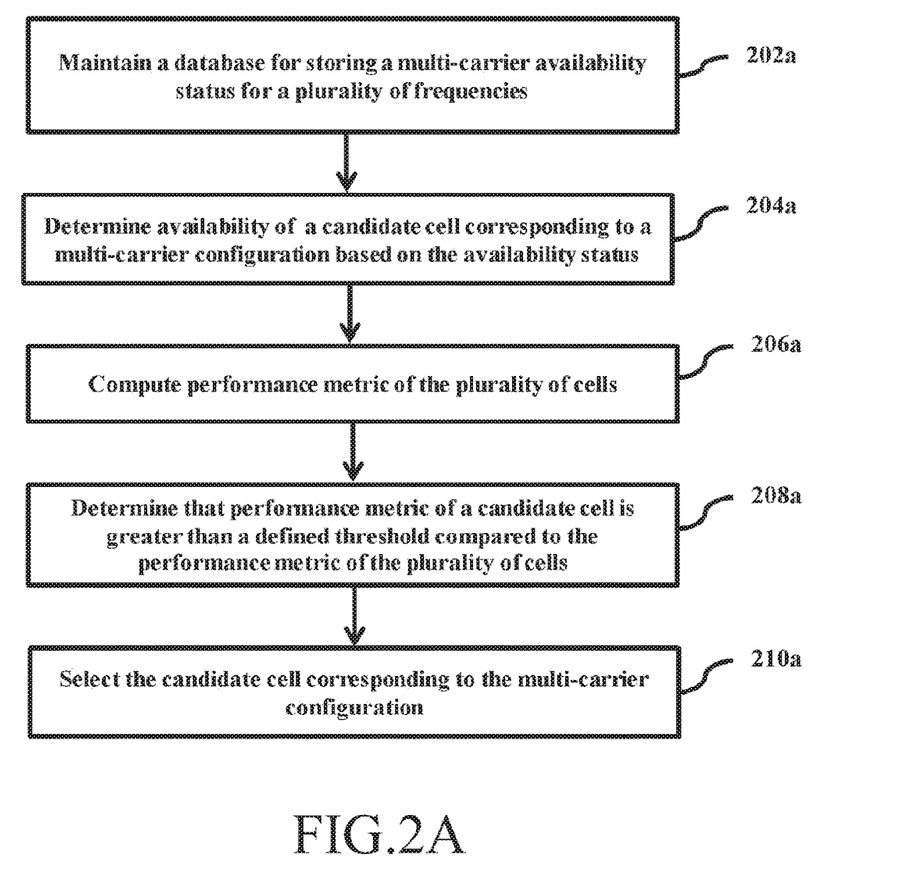
FIG. 2A is a flowchart illustrating a method of selecting a candidate cell corresponding to a multi-carrier configuration, according to an embodiment of the present disclosure.

FIG. 2A is a flowchart diagram illustrating a method of selecting a candidate cell corresponding to a multi-carrier configuration, according to an embodiment of the present disclosure. During connected mode, the network informs the UE of the multi-carrier frequencies and the UE indicates that these frequencies are candidate frequencies in the database. In step 202a, the method maintains a database for storing a multi-carrier availability status for a plurality of frequencies. In an embodiment of the present disclosure, each frequency includes a multi-carrier configuration and/or a single-carrier configuration. In step 204a, the method determines availability of a candidate cell corresponding to the multi-carrier configuration based on the availability status. In step 206a, the method computes performance metric of the plurality of cells. The performance metric of the plurality of cells is signal strength, and/or a signal quality. Depending on the RAT, the signal strength and/or signal quality are computed. In step 208a, the method determines whether the performance metric of the candidate cell is greater than a pre-defined threshold compared to the performance metric of the plurality of cells. The pre-defined threshold is hard coded in the UE. Further, the UE compares the performance metric of a candidate cell with the pre-defined threshold. When the performance metric of the candidate cell is greater than the pre-defined threshold compared to the performance metric of the plurality of cells, in step 210a, the method selects the candidate cell corresponding to the multi-carrier configuration.

The sequence of steps can be performed by the UE using a microcontroller, a microprocessor, a controller unit, or any non-transitory computer readable storage medium.

The various actions, acts, blocks, steps, or the like in the method of FIG. 2A may be performed in the order presented, in a different order or simultaneously. Further, in some embodiments of the present disclosure, some of the actions, acts, blocks, steps, or the like may be omitted, added, modified, skipped, or the like without departing from the scope of the present invention.

Figure 2B:
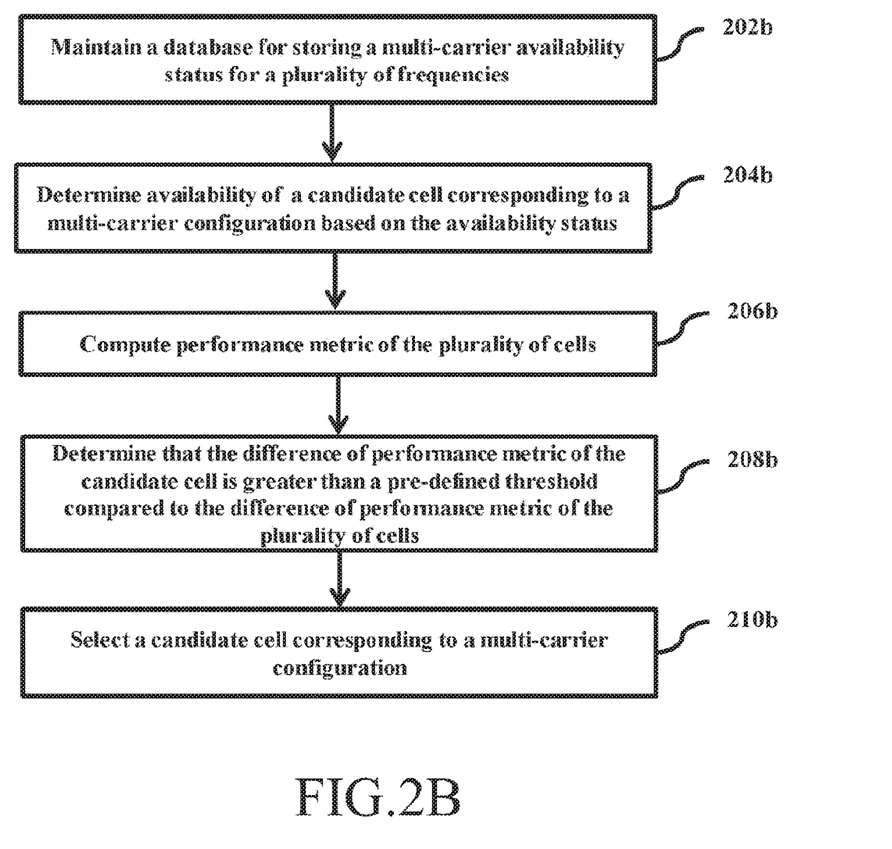
FIG. 2B is a flowchart illustrating another method of selecting a candidate cell corresponding to a multi-carrier configuration, according to an embodiment of the present disclosure.

FIG. 2B is a flowchart illustrating another method of selecting a candidate cell corresponding to a multi-carrier configuration, according to an embodiment of the present disclosure. In step 202b, the method maintains a database for storing a multi-carrier availability status for a plurality of frequencies. Each frequency includes a candidate frequency with a multi-carrier configuration and/or a single-carrier configuration. In step 204b, the method determines availability of a candidate cell corresponding to the multi-carrier configuration based on the availability status. In step 206b, the method computes the performance metric of the plurality of cells. The performance metric of the plurality of cells is signal strength, and/or a signal quality. Depending on the RAT, the signal strength and/or signal quality are computed. In step 208b, the method determines whether the difference of the performance metric of the candidate cell is greater than a pre-defined threshold compared to the difference of performance metric of the plurality of cells. The difference of the performance metric of the candidate cell refers to the difference between the performance metric of the candidate cell and one of the plurality of cells other than the candidate cell. Here, the method first computes the performance metric of the candidate cell, and then computes the difference in the performance metric over a period of time. The method compares the difference in the performance metric with a pre-defined threshold, and computes the difference of performance metric of plurality of cells. If the difference of the performance metric of the candidate cell is greater than the pre-defined threshold compared to the difference of the performance metric of the plurality cells, then the candidate cell is selected.

For example, the performance metric is the signal strength of the candidate cell which is computed to be 5 dB, and the difference of the signal strength is computed to be 4 dB. The pre-defined threshold is 3 dB. Similarly, the difference of the signal strength of the plurality of cells is computed to be 1 dB. In this case, the 4 dB difference is greater than the pre-defined threshold of 3 dB compared to 1 dB of the plurality of cells. Thus, the candidate cell is selected.

In an embodiment of the present disclosure, the pre-defined threshold is hard coded in the UE. Further, the UE compares the difference of the performance metric of a candidate cell with the pre-defined threshold. Whenever, the difference of the performance metric is greater than the pre-defined threshold compared to the difference of performance metric of the plurality of cells, then in step 210b, the method selects a candidate cell corresponding to the multi-carrier configuration.

The sequence of steps can be performed by the UE using a microcontroller, a microprocessor, a controller unit or any non-transitory computer readable storage medium.

The various actions, acts, blocks, steps, or the like in the method of FIG. 2B may be performed in the order presented, in a different order or simultaneously. Further, in some embodiments, some of the actions, acts, blocks, steps, or the like may be omitted, added, modified, skipped, or the like without departing from the scope of the present invention.

Figure 2C:
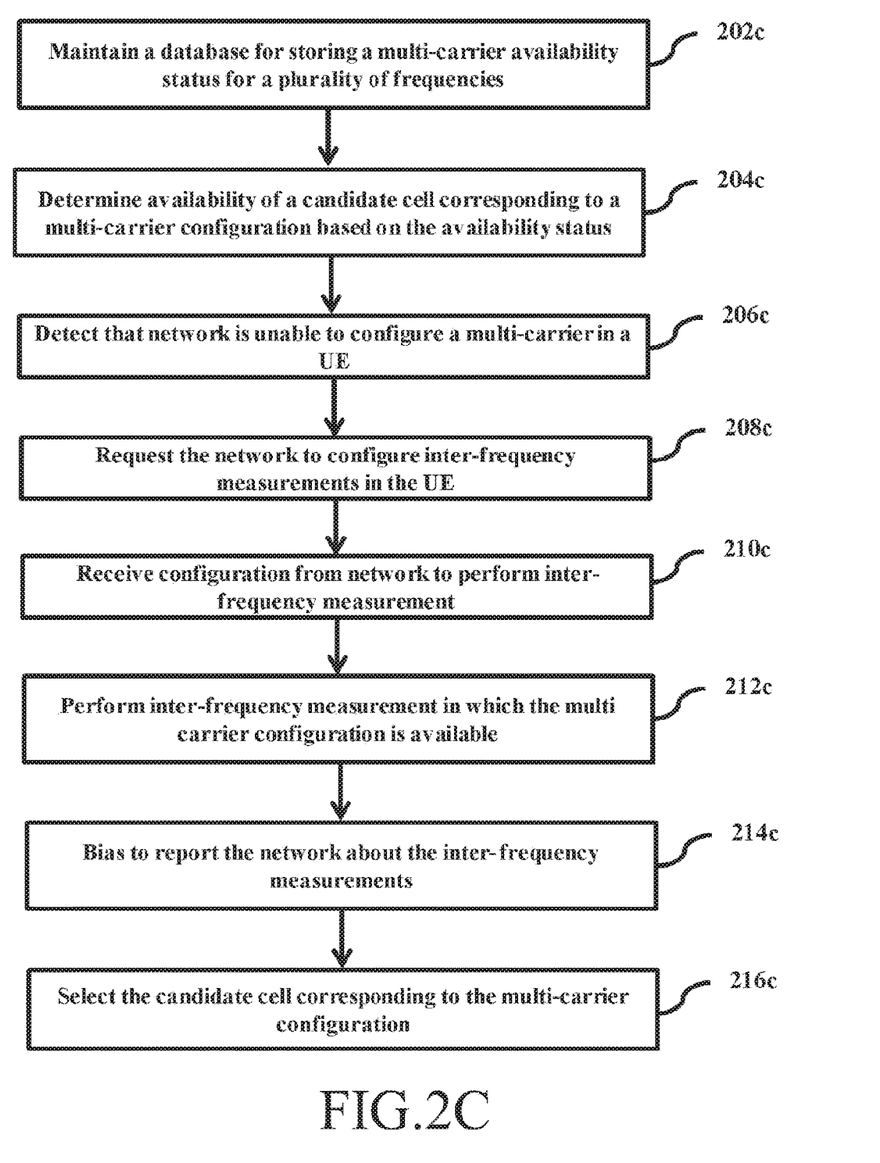
FIG. 2C is a flowchart illustrating another method of selecting a candidate cell corresponding to a multi-carrier configuration, according to an embodiment of the present disclosure.

FIG. 2C is a flowchart illustrating another method of selecting a candidate cell, according to an embodiment of the present disclosure. In step 202c, the method maintaining a database for storing a multi-carrier availability status for a plurality of frequencies. Each frequency includes a multi-carrier configuration and/or a single-carrier configuration. In step 204c, the method determines the availability of a candidate cell corresponding to a multi-carrier configuration based on the availability status. In step 206c, the method detects, by the UE, whether the network is unable to configure a multi-carrier configuration in the UE. In step 208c, the method requests the network to configure inter-frequency measurements in the UE.

The UE may have a history of frequencies where multi-carrier operation is allowed and where the network is not currently configuring multi-carrier operation. In this case, the UE may send a measurement report to the network to allow the network to configure inter-frequency measurements.

For example, in the universal mobile telecommunications system (UMTS), a UE can report 1F, 2D, 6A events to the network to initiate compressed mode measurements for the UE. For example, the UE can report less signal strength for the current serving frequency or any measurement event that can make the network configure compressed mode measurements for the UE. This enables the UE to measure frequencies other than the serving frequency.

In step 210c, the method receives the configuration from the network to perform the inter-frequency measurement. In an embodiment of the present disclosure, after the network configures compressed mode measurements, in step 212c, the method performs the inter-frequency measurement in which the multi-carrier configuration is available. In step 214c, the method performs to biasing to report inter frequency measurements on frequencies where dual carrier operation is possible.

When the UE has the capability to measure other frequencies without network assistance, it may directly report measurement results for frequencies where multi-carrier configuration is possible to the network. This can help the UE to achieve better throughput through multi-carrier configuration where the radio frequency is being shared with other SIMs.

In step 216c, the method selects the candidate cell corresponding to the multi-carrier configuration.

The sequence of steps can be performed by the UE using a microcontroller, a microprocessor, a controller unit or any non-transitory computer readable storage medium.

The various actions, acts, blocks, steps, or the like in the method of FIG. 2C may be performed in the order presented, in a different order or simultaneously. Further, in some embodiments of the present disclosure, some of the actions, acts, blocks, steps, or the like may be omitted, added, modified, skipped, or the like without departing from the scope of the present invention.

Figure 3A:
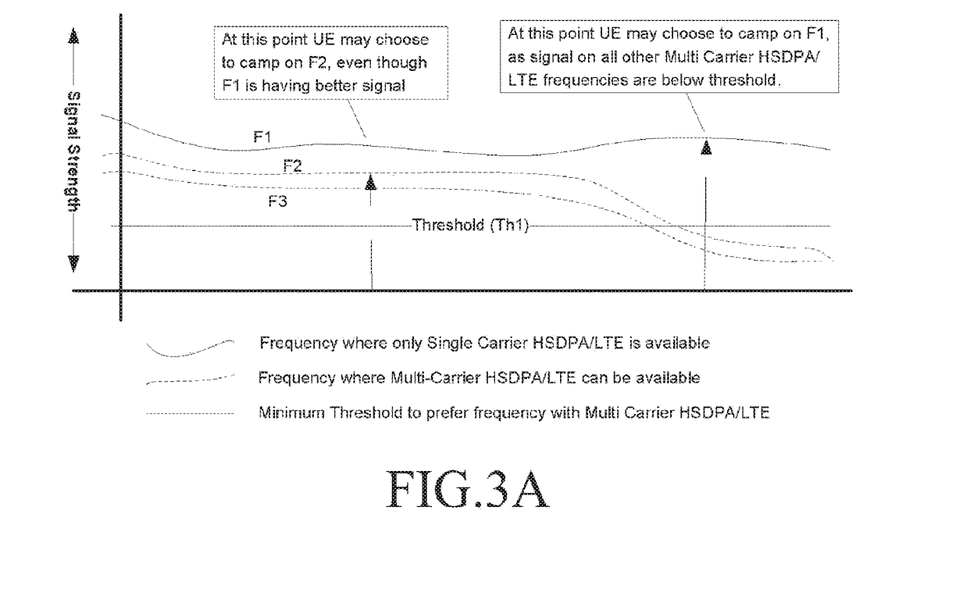
FIGS. 3A and 3B show example scenarios for selecting a multi-carrier configuration based on multi-carrier HSPA/LTE/GSM/CDMA availability, according an to embodiment of the present disclosure.
Figure 3B:
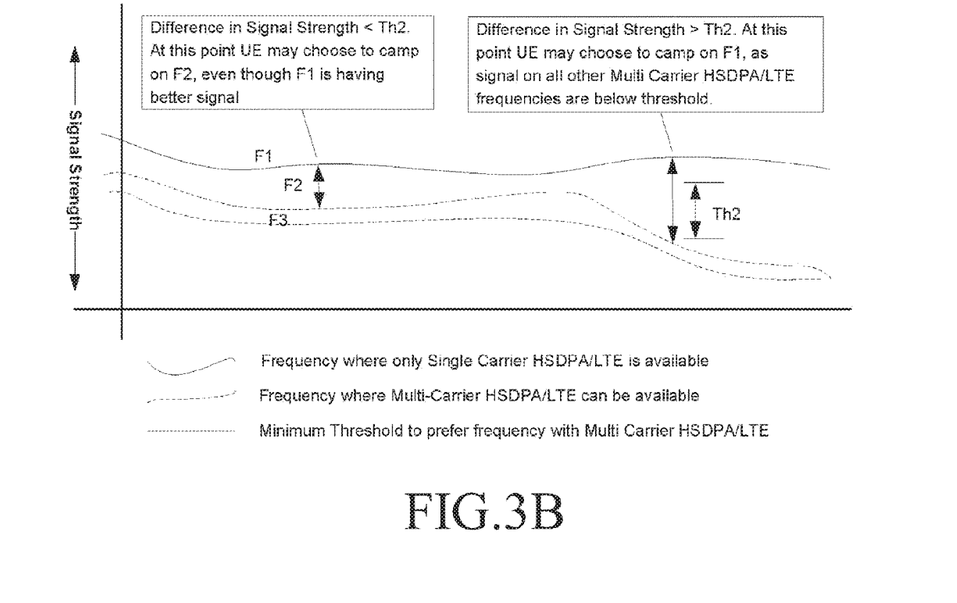

FIGS. 3A and 3B show an example scenario for selecting a candidate cell corresponding to multi-carrier HSPA/LTE/GSM/CDMA availability, according to an embodiment of the present disclosure. The UE can have a minimum threshold of signal strength to give preference to a multi-carrier HSPA/LTE/GSM/CDMA frequency over a single carrier frequency. Such frequencies will be given preference only when the minimum threshold criteria are satisfied.

As shown in FIG. 3A, suppose Frequency F1 has single carrier HSPA/LTE/GSM/CDMA frequency and Frequency F2 has multi-carrier HSPA/LTE frequencies. The UE can apply the pre-defined threshold in different ways as described below:

As shown in FIG. 3A, if F2 signal strength is above a pre-defined Threshold (Th1), F2 is selected even if F1 has better signal strength than F2. Th1 should be more than the minimum threshold to satisfy normal cell selection criteria of the particular RAT.

As shown in FIG. 3B, F2 signal strength is lower than F1 and both satisfy the normal cell selection criteria of the RAT. If the difference in signal strength between F2 and F1 is less than a pre-defined Threshold (Th2), F2 is selected even if F1 has better signal strength. The difference of the performance metric of the candidate cell refers to the difference between the performance metric of the candidate cell and one of the plurality of cells other than the candidate cell.

The method according to the present disclosure can also be used in other radio access technologies, where both single carrier and multi-carrier technologies can co-exist in the same geographical area.

Since the multi-carrier configuration will result in higher utilization of UE resources like the battery or the CPU, the UE may also decide not to give preference to choosing frequencies based on the method according to the present disclosure. Some of these conditions can be the knowledge of the type of connection, device or subscription type, and knowledge of single SIM operation in multi-SIM device, among others.

In certain scenarios, because of reasons such as congestion, the network may bar the UE from connecting to certain frequencies. If these frequencies were allocated as part of the multi-carrier configuration in the past, and the UE gives preference to such frequency, it can result in a denial of service. To avoid such a case, the UE according to the present disclosure will stop giving preference to such frequencies once the network rejects the UE connection attempt to any frequency.

In an embodiment of the present disclosure, the UE camps on the selected candidate cell.

Figure 4:
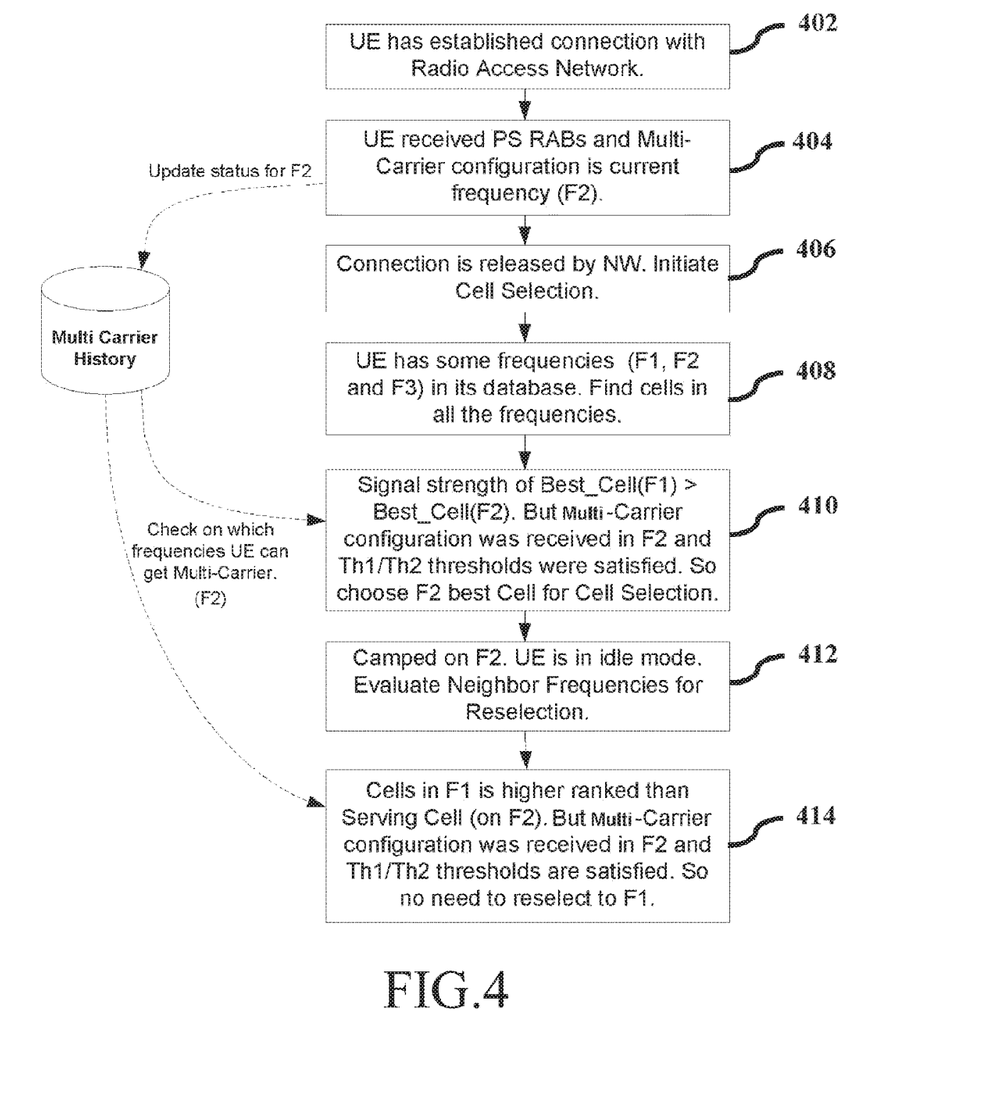
FIG. 4 is a flow diagram illustrating an example method of setting multi-carrier status for a multi-carrier configuration and selecting one of the available frequencies with respect to the multi-carrier configuration during the cell selection or cell reselection process, according to an embodiment of the present disclosure.

FIG. 4 is a flow diagram illustrating an example method of setting multi-carrier status for a multi-carrier configuration and selecting one of the available frequencies with respect to the multi-carrier configuration during the cell selection or cell reselection process, according to an embodiment of the present disclosure. Initially, in step 402, the UE establishes connection with a radio access network (RAN). Then, in step 404, the UE receives packet switching (PS) radio access bearers (RABs) and multi-carrier configuration in the current frequency F2. The UE marks/updates the status of F2 in the database as the multi-carrier configuration. Then, in step 406, the network releases the connection to initiate cell selection. In step 408, the database of the UE includes some frequencies F1, F2 and F3. The UE searches for cells that correspond to all the frequencies. The UE determines which frequency in the database supports multi-carrier configuration. In step 410, the UE determines whether the signal strength of cell (F1) is greater than the signal strength of cell (F2). However, the UE determines whether the multi-carrier configuration was received on F2 and also whether the thresholds were satisfied for tF2. Hence, the UE selects the cell that corresponds to F2 as the candidate/best cell for cell selection. Further, in step 412, the UE camps on the candidate cell which corresponds to F2. Now, the UE is in idle mode and evaluates neighbor frequencies for cell reselection. In step 414, the cell that corresponds to F1 is higher ranked than the serving cell that corresponds to F2. However, the multi-carrier configuration was received on F2 (checked in the database) and the thresholds are satisfied for F2. Hence, the UE decides to stay with the cell that corresponds to F2, and it is not necessary to perform reselection to the cell that corresponds to F1.

Figure 5:
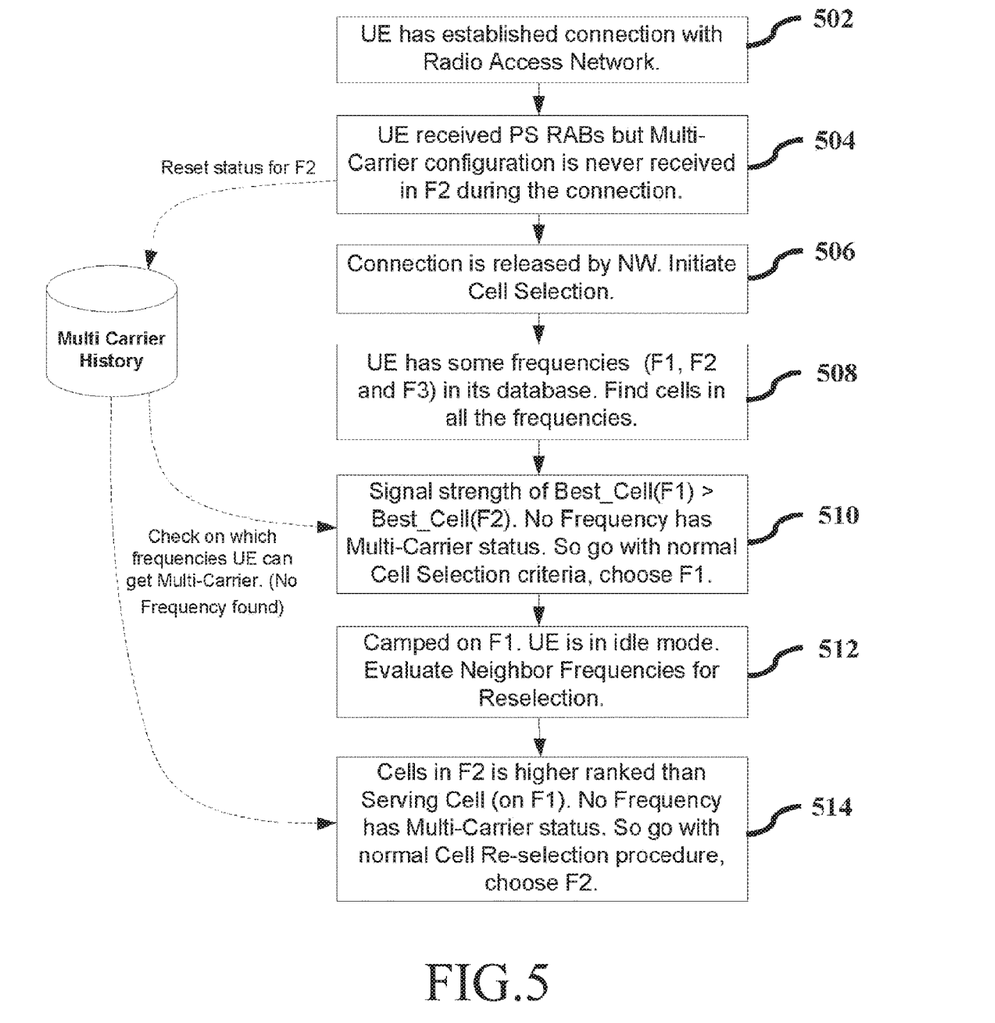
FIG. 5 is a flow diagram illustrating an example method of clearing multi-carrier status for a multi-carrier configuration and selecting one of the available frequencies with respect to the multi-carrier configuration during the cell selection or a cell reselection process, according to an embodiment of the present disclosure.

FIG. 5 is a flow diagram illustrating an example method of clearing multi-carrier status for a frequency and selecting one of the available frequencies with respect to a multi-carrier configuration during the cell selection or cell reselection process, according to an embodiment of the present disclosure . . . . Initially, in step 502, the UE establishes connection with the RAN. Then, in step 504, the UE receives PS RABs, but the multi-carrier configuration is never received in F2 during the connection. The UE resets or clears the status of F2. In step 506, the connection is released by the network and the UE initiates cell selection. In step 508, the database of UE includes some frequencies F1, F2 and F3. The UE searches for cells that correspond to all these frequencies. In step 510, the UE determines whether the signal strength of cell (F1) is greater than the signal strength of cell (F2). However, there is no multi-carrier configuration received in any of these frequencies. Hence, the UE performs the search with the standard cell selection criteria and chooses a cell that corresponds to F1. Further, in step 512, the UE camps on the cell that corresponds to F1. Now, the UE is in idle mode and evaluates neighbor frequencies for cell reselection. In step 514, the cell that corresponds to F2 is higher ranked than the serving cell that corresponds to F1. Further, there is no multi-carrier configuration received in any frequencies. Hence, the UE performs the standard cell selection criteria and chooses the cell that corresponds to F2.

The embodiments disclosed herein can be implemented through at least one software program running on at least one hardware device and performing network management functions to control the elements.

It should be understood, however, that the description herein of the present disclosure, while indicating certain embodiments and numerous specific details thereof, are given by way of illustration and not of limitation. Many changes and modifications may be made within the scope of the embodiments herein without departing from the spirit thereof, and the embodiments herein include all such modifications.

While certain embodiments have been shown and described, it will be understood by those skilled in the art that various changes in form and detail may be made therein without departing from the spirit and scope of the disclosure as defined by the appended claims.

What is claimed is:

1. A method of cell selection by a user equipment (UE), the method comprising:
   receiving, from a network, an indication of multi-carrier availability;
   generating a multi-carrier availability status based on the indication of multi-carrier availability;
   maintaining a database for storing the multi-carrier availability status for a plurality of frequencies, wherein each frequency includes at least one of a multi-carrier configuration and a single-carrier configuration;
   determining whether a first candidate cell, from among a plurality of cells related to the plurality of frequencies, corresponding to the multi-carrier configuration, is available based on the multi-carrier availability status;
   determining whether a second candidate cell, from among the plurality of cells, corresponding to the single-carrier configuration, is available;
   obtaining a performance metric of the first candidate cell;
   obtaining a performance metric of the second candidate cell; and
   selecting the first candidate cell when the performance metric of the second candidate cell is greater than the performance metric of the first candidate cell, and the performance metric of the first candidate cell is greater than a first threshold.

2. The method of claim 1, further comprising:
   selecting the second candidate cell when the performance metric of the second candidate cell is greater than the performance metric of the first candidate cell, and the performance metric of the first candidate cell is equal to or less than the first threshold.

3. The method of claim 1, further comprising:
   obtaining a difference between the performance metric of the first candidate cell and the performance metric of the second candidate cell;
   selecting the first candidate cell when the difference between the performance metric of the first candidate cell and the performance metric of the second candidate cell, is equal to or less than a second threshold; and
   selecting the second candidate cell when the difference between the performance metric of the first candidate cell and the performance metric of the second candidate cell, is greater than the second threshold,
   wherein the performance metric of the second candidate cell is greater than the performance metric of the first candidate cell.

4. The method of claim 1, further comprising camping on the first candidate cell.

5. The method of claim 1, wherein the performance metric of each of the first candidate cell and the second candidate cell is at least one of signal strength and a signal quality.

6. The method of claim 1, wherein the database is dynamically updated for storing the multi-carrier availability status.

7. The method of claim 1, wherein selecting the first candidate cell corresponding to the multi-carrier configuration comprises:
   detecting whether the network is unable to configure the multi-carrier configuration in the UE;
   requesting the network to configure inter-frequency measurements in the UE;
   performing inter-frequency measurement in which the multi-carrier configuration is available upon receiving the indication of multi-carrier availability from the network;
   performing biasing to report to the network the inter-frequency measurements; and
   selecting the first candidate cell corresponding to the multi-carrier configuration.

8. A user equipment (UE) comprising:
   a memory; and
   at least one processor coupled to the memory,
   wherein the at least one processor is configured to:
      receive, from a network, an indication of multi-carrier availability;
      generate a multi-carrier availability status based on the indication of multi-carrier availability;
      maintain a database to store the multi-carrier availability status for a plurality of frequencies, wherein each frequency includes at least one of a multi-carrier configuration and a single-carrier configuration;
      determine whether a first candidate cell, from among a plurality of cells related to the plurality of frequencies, corresponding to the multi-carrier configuration is available based on the multi-carrier availability status; and
      determine whether a second candidate cell, from among the plurality of cells, corresponding to the single-carrier configuration, is available;
      obtain a performance metric of the first candidate cell;
      obtain a performance metric of the second candidate cell; and
      select the first candidate cell when the performance metric of the second candidate cell is greater than the performance metric of the first candidate cell, and the performance metric of the first candidate cell is greater than a first threshold.

9. The UE of claim 8, wherein the at least one processor is further configured to:
   select the second candidate cell when the performance metric of the second candidate cell is greater than the performance metric of the first candidate cell, and the performance metric of the first candidate cell is equal to or less than the first threshold.

10. The UE of claim 8, wherein the at least one processor is further configured to:
    obtain a difference between the performance metric of the first candidate cell and the performance metric of the second candidate cell;
    select the first candidate cell when the difference between the performance metric of the first candidate cell and the performance metric of the second candidate cell, is equal to or less than a second threshold; and
    select the second candidate cell when the difference between the performance metric of the first candidate cell and the performance metric of the second candidate cell is greater than the second threshold,
    wherein the performance metric of the second candidate cell is greater than the performance metric of the first candidate cell.

11. The UE of claim 8, wherein the at least one processor is further configured to camp on the first candidate cell.

12. The UE of claim 8, wherein the performance metric of each of the first candidate cell and the second candidate cell is at least one of signal strength and a signal quality.

13. The UE of claim 8, wherein the database is dynamically updated to store the multi-carrier availability status.

14. The UE of claim 8, wherein the at least one processor is further configured to:
    detect whether the network is unable to configure the multi-carrier configuration in the UE;
    request the network to configure inter-frequency measurements in the UE;
    perform inter-frequency measurement in which the multi-carrier configuration is available upon receiving the indication of multi-carrier availability from the network;
    perform biasing to report to the network the inter-frequency measurements; and
    select the first candidate cell that corresponds to the multi-carrier configuration.

* * * * *